United States Patent Office 3,169,149
Patented Feb. 9, 1965

3,169,149
PREPARATION OF 2-2'-DIHYDROXYDIPHENYLS
William Derek Walsh, Norton-on-Tees, England, assignor to Imperial Chemical Industries Limited, London, England, a corporation of Great Britain
No Drawing. Filed Sept. 18, 1961, Ser. No. 138,603
Claims priority, application Great Britain, Oct. 3, 1960, 33,833/60
4 Claims. (Cl. 260—620)

This invention relates to the preparation of 2-2'-dihydroxydiphenyls, that is, 2-2'-dihydroxydiphenyl and its homologues.

According to the present invention there is provided a process for the preparation of a 2-2'-dihydroxydiphenyl which comprises reacting dibenzofuran or its homologues at elevated temperature and under superatmospheric pressure with aqueous alkali and liberating the free dihydroxydiphenyl from the resulting alkali metal salt thereof. Preferably the reaction is carried out in an inert gas such as nitrogen, at a pressure of 100 to 350 atmospheres and at a temperature of 300° to 400° C. The alkali used is preferably a solution of a hydroxide of an alkali metal such as sodium, particularly at a concentration of 20 to 30% by weight in the solution. Preferably also the weight of alkali used in the solution exceeds that of the dibenzofuran with which it is heated.

It will be understood that the 2-2'-dihydroxydiphenyl obtained from the process according to this invention is produced in the form of a salt, from which the parent dihydroxydiphenyl may be readily recovered for example, by treatment with a dilute mineral acid.

EXAMPLE 50 grams of dibenzofuran were heated in a sealed rocking autoclave with 300 mls. of a 25% by weight aqueous solution of sodium hydroxide to a temperature of 350° C. in an atmosphere of nitrogen, the ultimate pressure which developed being 300 atmospheres. After 20 hours the autoclave contents were cooled and filtered to remove unchanged dibenzofuran and the filtrate was acidified with dilute sulphuric acid when 20 grams of 2-2'-dihydroxydiphenyl separated and were filtered off.

I claim:
1. A process for the preparation of 2-2'-dihydroxydiphenyl which comprises reacting dibenzofuran at elevated temperature and superatmospheric pressure with an aqueous solution of an alkali metal hydroxide and liberating the free dihydroxydiphenyl from the resulting alkali metal salt thereof.
2. A process as claimed in claim 1 in which the reaction pressure is at least 100 atmospheres and the reaction temperature is between about 300° C. and about 400° C.
3. A process as claimed in claim 1 in which the reaction is carried out in the presence of an inert gas.
4. A process as claimed in claim 1 in which the concentration of alkali metal hydroxide in the solution is between about 20% and 30% by weight, and the weight of alkali metal hydroxide in said solution exceeds that of the dibenzofuran.

References Cited by the Examiner
UNITED STATES PATENTS

| 1,737,841 | 12/29 | Hale et al. | 260—621 |
| 2,244,244 | 6/41 | Deseke | 260—620 |

FOREIGN PATENTS

| 130,679 | 4/02 | Germany. |

LEON ZITVER, Primary Examiner.
CHARLES B. PARKER, HAROLD G. MOORE,
Examiners.